(12) United States Patent
Wada et al.

(10) Patent No.: US 11,471,770 B2
(45) Date of Patent: Oct. 18, 2022

(54) GAME PROGRAM, GAME SERVER, GAME SYSTEM, AND GAME DEVICE

(71) Applicant: CYGAMES, INC., Tokyo (JP)

(72) Inventors: Kodai Wada, Tokyo (JP); Kunihiko Matsuda, Tokyo (JP); Satoshi Hiroshima, Tokyo (JP)

(73) Assignee: CYGAMES, INC., Tokyo (JP)

( * ) Notice: Subject to any disclaimer, the term of this patent is extended or adjusted under 35 U.S.C. 154(b) by 0 days.

(21) Appl. No.: 17/155,449

(22) Filed: Jan. 22, 2021

(65) Prior Publication Data

US 2021/0138346 A1    May 13, 2021

Related U.S. Application Data (63) Continuation of application No. PCT/JP2019/028528, filed on Jul. 19, 2019.

(30) Foreign Application Priority Data

Jul. 23, 2018 (JP) .............................. JP2018-137925

(51) Int. Cl.
   *A63F 13/58* (2014.01)
   *A63F 13/35* (2014.01)
   *A63F 13/79* (2014.01)

(52) U.S. Cl.
   CPC .............. *A63F 13/58* (2014.09); *A63F 13/35* (2014.09); *A63F 13/79* (2014.09)

(58) Field of Classification Search
   CPC ........... A63F 13/58; A63F 13/35; A63F 13/79
   USPC .......................................................... 463/31
   See application file for complete search history.

(56) References Cited

U.S. PATENT DOCUMENTS

| | | | | |
|---|---|---|---|---|
| 10,987,587 | B2* | 4/2021 | Garbut | G06T 13/40 |
| 2010/0029384 | A1* | 2/2010 | Andersen | G06T 13/00 |
| | | | | 463/43 |
| 2012/0094773 | A1* | 4/2012 | Suzuki | A63F 13/79 |
| | | | | 463/43 |
| 2013/0064456 | A1* | 3/2013 | Kudo | A63F 13/10 |
| | | | | 382/195 |
| 2013/0083005 | A1* | 4/2013 | Arrasvuori | H04L 67/52 |
| | | | | 345/419 |

(Continued)

FOREIGN PATENT DOCUMENTS

| | | |
|---|---|---|
| JP | 2014-91041 A | 5/2014 |
| JP | 2014-195504 A | 10/2014 |

OTHER PUBLICATIONS

International Search Report in Application No. PCT/JP2019/028528, dated Aug. 27, 2019 (5 pages).

(Continued)

*Primary Examiner* — Michael A Cuff
(74) *Attorney, Agent, or Firm* — Osha Bergman Watanabe & Burton LLP (57) ABSTRACT

A game server 30 includes: a processing unit 38 that deletes an item obtained by a user and increases the value of a parameter on the basis of an experience value of the deleted item when a condition preset by the user is satisfied; an item box 35 that stores the item obtained by the user when the condition is not satisfied; and a present box 36 that stores the item obtained by the user when the condition is not satisfied and the number of items stored in the item box 35 has reached an upper-limit value.

12 Claims, 6 Drawing Sheets

(56) References Cited

U.S. PATENT DOCUMENTS

| | | | |
|---|---|---|---|
| 2013/0178257 A1* | 7/2013 | Langseth | A63F 13/23 345/419 |
| 2014/0149794 A1* | 5/2014 | Shetty | G06F 16/955 709/213 |
| 2016/0171827 A1* | 6/2016 | Washington | G07F 17/3227 463/16 |
| 2017/0072311 A1* | 3/2017 | Maejima | A63F 13/42 |
| 2018/0074668 A1* | 3/2018 | Chapman | G06F 16/951 |
| 2019/0151758 A1* | 5/2019 | Anglin | G06F 16/953 |
| 2020/0261802 A1* | 8/2020 | Zhuang | A63F 13/92 |

OTHER PUBLICATIONS

Written Opinion issued in International Application No. PCT/JP2019/028528, dated Aug. 27, 2019 (5 pages).
QBIST Inc., Se-Mook Drafon Quest Builders; Revive Alefgard Official Guidebook, first version, Dragon Q, first version, Square Enix Co., Ltd., MAtssuura, Katsuyoshi, Mar. 10, 2016, p. 15 (3 pages).

* cited by examiner

GAME PROGRAM, GAME SERVER, GAME SYSTEM, AND GAME DEVICE

TECHNICAL FIELD

The present invention relates to game programs, game servers, game systems, and game devices.

BACKGROUND ART

Social games developed to be run under an operating environment such as a web browser of a mobile terminal have become popular. As an example of such social games, role playing games in which items are obtained by proceeding with game play so as to accomplish quests are known. With role playing games of this type, storage areas for storing and managing items obtained by a user are provided in a game server. Items that are stored in such storage areas are managed in association with the user, and each user is allowed to perform game operations in relation to items via the user's own communication terminal. As storage areas of this type, the mainstream is to provide two kinds of storage areas in a game server, as described, for example, in paragraph 0046 of Japanese Unexamined Patent Application, Publication No. 2014-195504. Although these two kinds of storage areas are called by different names depending on the type of game, etc., there is no substantial difference in the functions thereof.

In this description, one of these two types of storage areas will be referred to as a present box, and the other will be referred to as an item box. The user can selectively move an item stored in the present box to the item box. Although there is no upper limit as to the number of items that can be stored in the present box, items stored in the present box cannot be used in the game until they are moved to the item box. Furthermore, storage periods are set for some items stored in the present box, and an item is automatically deleted when the storage period thereof expires. Meanwhile, although items stored in the item box can directly be used in the game, an upper limit is set as to the number of items that can be stored in the item box.

By setting an upper limit as to the number of items that can be stored in the item box, as described above, it is possible to give the user motivation for managing to play the game with limited items, which serves to enhance the fun of the game. Furthermore, by setting storage periods for some items stored in the present box, it is possible to make adjustments so that the data management load at the game server will not be excessive.

CITATION LIST

Patent Literature

{PTL 1}
Japanese Unexamined Patent Application, Publication No. 2014-195504

SUMMARY OF INVENTION

Technical Problem

However, among high-level users, there are some users who can obtain a large number of items, and such users have the need for disposing of items having low rarity since such items lack attractiveness. In such cases, in order to dispose of an item, it has conventionally been the case to require actions for moving the item from the present box to the item box and then selecting the item and selecting a disposal method, which is laborious for the user. Furthermore, since such items having low rarity are useful in obtaining items having high experience values even if those items are unnecessary for the user at the time when they are obtained, there is a need to keep records of obtaining such items instead of simply disposing of unnecessary items.

Accordingly, it is an object of the present invention to address the problem described above, thereby alleviating laboriousness concerning the disposal of items obtained.

Solution to Problem

In order to solve the problem described above, a game program according to the present invention causes a computer system to execute: (i) a step of determining, when a user has obtained an item, whether or not the item satisfies a condition preset by the user; (ii) a step of deleting the item obtained by the user and increasing the value of a second parameter on the basis of the value of a first parameter of the deleted item when the condition preset by the user is satisfied; (iii) a step of storing the item obtained by the user in a first storage area of the computer system when the condition preset by the user is not satisfied, the first storage area having set therefor an upper-limit value as to the number of instances of the item that can be stored therein; (iv) a step of storing the item obtained by the user in a second storage area of the computer system when the condition preset by the user is not satisfied and the number of instances of the item stored in the first storage area has reached the upper-limit value; and (v) a step of storing a predetermined item in the first storage area when the value of the second parameter exceeds a threshold.

Advantageous Effects of Invention

The present invention makes it possible to alleviate the laboriousness of the disposal of items obtained.

DESCRIPTION OF EMBODIMENTS

An embodiment according to an aspect of the present invention will be described below on the basis of the drawings. The embodiment of the present invention is intended to facilitate the understanding of the present invention, and should not be construed to limit the present invention. The present invention may be modified or improved without departing from the spirit thereof, and the present invention encompasses equivalents thereof. Note that the same reference signs signify the same constituent elements, and repeated descriptions thereof will be omitted.

First, an overview of this embodiment will be described. In a game according to this embodiment, goals referred to as quests are set, and a user obtains items in the process of accomplishing the quests. For example, a quest is constituted of a scenario and a battle. Various methods can be set as methods of obtaining items, such as gacha and purchasing using an in-game currency, as well as accomplishing a quest. Items generally refer to virtual objects having the effect of enriching the game. Items may be classified into a plurality of types from the viewpoint of the roles thereof in the game. For example, items may be classified into roles such as weapons and summons. A weapon is, for example, a virtual object having an offensive or defensive effect in a battle. A summon is, for example, a virtual object having an effect of enhancing the offensive power or defensive power of a weapon. Each item has various parameters set therefor. Examples of such parameters include a parameter quantitatively indicating the offensive power, a parameter quantitatively indicating the defensive power, a parameter quantitatively indicating an experience value, and a parameter indicating bonus points. The experience value is a parameter quantitatively indicating the degree of the intensity of an effect (e.g., the offensive power or defensive power) in the game, and the value thereof increases through growth. Growth refers to, for example, the accomplishment of certain goals by the user. An example of a certain goal is the accomplishment of a quest, and the content of the goal may be set in accordance with the kind of game. It may be allowable to combine a plurality of items of the same type into a single new item. In this case, the sum of the individual experience values of the plurality of items before combining may be used as the experience value of the new item obtained by combining the plurality of items. An example of combining is processing for deleting an item owned by the user and enhancing another item instead. The user can select an item to be enhanced and an item to be combined and perform combining processing. Another example of combining is processing for deleting two or more items owned by the user and allowing the user to obtain another item. Also in this case, the sum of the experience values of the individual items may be used.

In this embodiment, a game server has a present box and an item box as storage areas for storing items obtained by the user. The user can set a condition for automatically deleting an item obtained and converting that item into a parameter. For convenience of description, this condition will be referred to as an automatic conversion condition. When the automatic conversion condition is not satisfied, an item obtained by the user is stored either in the present box or in the item box. Meanwhile, when the automatic conversion condition is satisfied, an item obtained by the user is not stored either in the present box or in the item box but is automatically deleted, and the value of a second parameter is increased on the basis of the value of a first parameter of that deleted item. For convenience of description, this processing will be referred to as automatic conversion processing. Here, the first parameter is a parameter associated with an obtained item for the purpose of game processing, and for example, the first parameter is a parameter quantitatively indicating an experience value. The second parameter is a parameter used for the purpose of giving a predetermined item to the user through the automatic conversion processing. The value of the second parameter is increased on the basis of the value of the first parameter of the item deleted through the automatic conversion processing. As an example, the amount of increase in the second parameter may be equal to the value of the first parameter of the item deleted through the automatic conversion processing. As another example, for the second parameter, the cumulative value of the individual first parameters of a plurality of items automatically deleted through the automatic conversion processing may be counted. The initial value of the second parameter may be, for example, zero. As an example, in the case where the experience value of a single item automatically deleted through the automatic conversion processing is 500 points, processing for increasing the value of the second parameter by 500 points may be executed. As another example, in the case where the experience value of each of two items automatically deleted through the automatic conversion processing is 500 points, processing for increasing the value of the second parameter by 1000 points may be executed.

As the automatic conversion processing is repeated in the manner described above, the value of the second parameter exceeds a predefined threshold at a certain point in time. When the value of the second parameter exceeds the threshold, processing for assigning a predetermined item to the item box of the user is performed. The predetermined item may be, for example, an item with which the first parameter is associated, and the value of the first parameter associated with the predetermined item may be equal to the threshold. For example, in the case where 30,000 points is set as the threshold, processing for assigning an item for which an experience value of 30,000 points is set to the item box of the user as the predetermined item may be performed when the value of the second parameter exceeds 30,000 points.

Note that the user may be allowed to preset the predetermined item that is assigned to the user through the automatic conversion processing, and the threshold may be associated with the preset item. Then, the item associated with the threshold (the item set by the user as the item to be assigned to the user) may be assigned to the user as the predetermined item when the value of the second parameter exceeds the threshold. The value of a parameter indicating the owned number of instances of the predetermined item obtained by the user may be displayed in association with the predetermined item. For example, in the case where the user obtains one unit of the predetermined item, the value of the parameter indicating the owned number is increased by one. In the case where the user consumes one unit of the predetermined item through combining or the like, the value of the parameter indicating the owned number is decreased by one. When the second parameter exceeds the threshold, processing for increasing the parameter indicating the owned number by one is performed. With this configuration, it becomes possible for the user to readily confirm the owned number of instances of the predetermined item obtained by the user when the second parameter exceeds the threshold.

When the predetermined item is assigned to the user as a result of the value of the second parameter exceeding the threshold, a value corresponding to the threshold is subtracted from the value of the second parameter. Then, when the user obtains an item satisfying the automatic conversion condition, the automatic conversion processing is executed for that item, whereby the value of the second parameter is increased. The automatic conversion processing is repeated in this manner, and when the value of the second parameter exceeds the threshold again at a certain point in time, processing for assigning the predetermined item to the item box of the user is performed again. With the configuration described above, the user can repeat the automatic conversion processing, which serves to further alleviate the burden on the user concerning the disposal of items.

The automatic conversion processing according to this embodiment eliminates the need for the work of selecting an item and selecting a disposal method after the item is moved from the present box to the item box each time for the purpose of disposing of an unnecessary item among items obtained by the user, which serves to alleviate the burden on the user. Furthermore, it becomes possible to keep a record of obtaining an item in the form of an increase in the value of the second parameter by increasing the value of the second parameter on the basis of the value of the first parameter of an item deleted through the automatic conversion processing. This is useful in a game in which an item box for which an upper limit is set to the number of items that can be stored is used.

Figure 1:
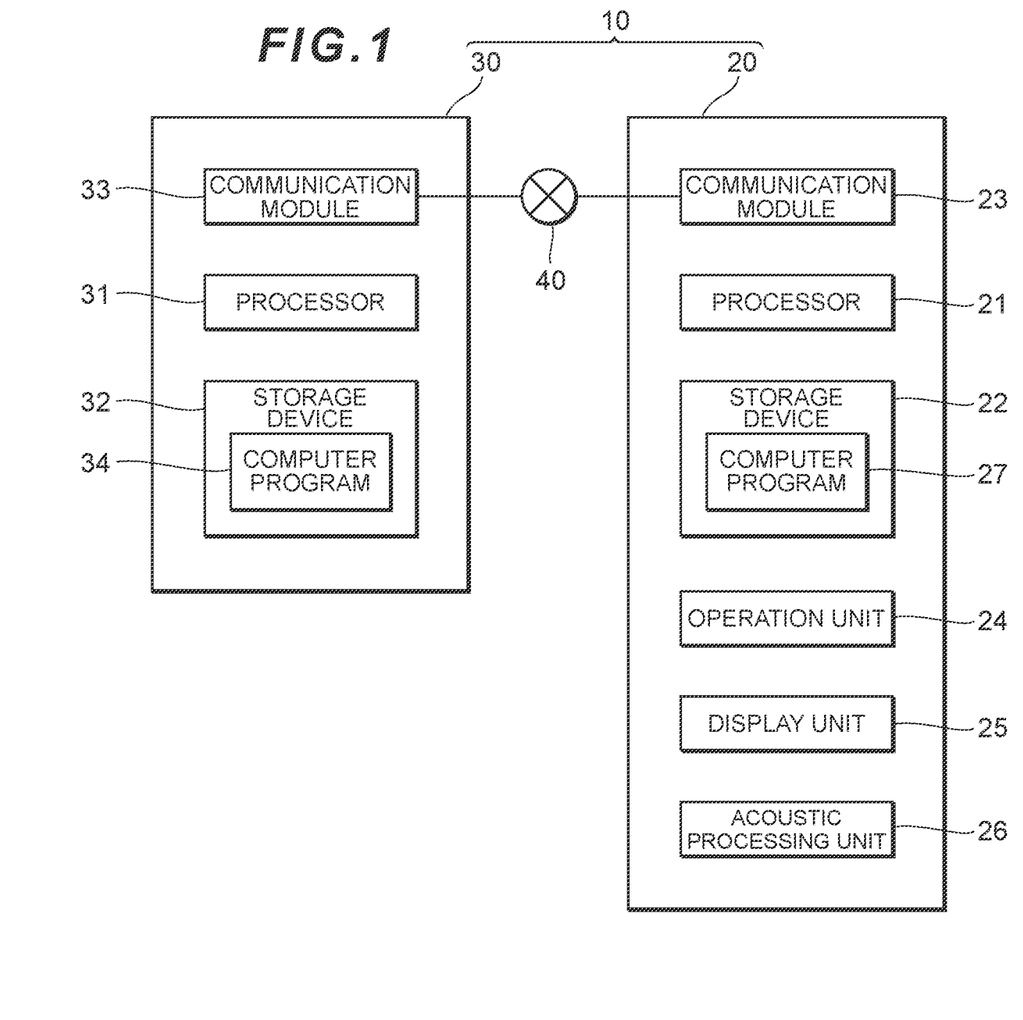
FIG. 1 is an illustration showing an example of the hardware configuration of a game system according to the present embodiment.

Next, the hardware configuration of a game system 10 according to this embodiment will be described with reference to FIG. 1. The game system 10 includes a game client 20 that receives the provision of an online game service and a game server 30 that provides the online game service. The game client 20 is a communication terminal of a user who plays the game. Examples of such a communication terminal include a multi-functional mobile phone called a smartphone, a tablet, a personal digital assistant, a personal computer, and a television receiver equipped with a communication function. Meanwhile, the game server 30 is managed, for example, by a company that provides a social networking service.

The game client 20 includes a processor 21, a storage device 22, a communication module 23, an operation unit 24, a display unit 25, and an acoustic processing unit 26 as hardware resources thereof. The storage device 22 is a computer-readable recording medium, such as a semiconductor memory (e.g., a volatile memory or a non-volatile memory) or a disk medium (e.g., an optical recording medium or a magneto-optical recording medium). The storage device 22 has recorded therein a computer program 27 for causing the processor 21 to execute game processing at the game client 20. The computer program 27 is, for example, a game program that can be downloaded from the game server 30 via a network 40. The communication module 23 is a communication circuit for sending and receiving data relating to game processing to and from the game server 30 via the network 40, which is wireless or wired. The operation unit 24 accepts the input of operations concerning game processing by the user. The operation unit 24 is, for example, operation keys or a touchscreen. The display unit 25 is an image processing circuit and a display device that display a game screen. Such a display device may be provided with, for example, a touchscreen that can also function as the operation unit 24. The acoustic processing unit 26 is an acoustic signal processing circuit and a speaker that output sound effects, background music, etc. in the game.

The game server 30 is a computer system including a processor 31, a storage device 32, and a communication module 33 as hardware resources thereof. The hardware configurations of the processor 31, the storage device 32, and the communication module 33 of the game server 30 are the same as the hardware configurations of the processor 21, the storage device 22, and the communication module 23, respectively, of the game client 20. The storage device 32 has recorded therein a computer program 34 for causing the processor 31 to execute game processing at the game server 30. The computer program 34 is a game program programmed for the game processing at the game server 30.

Note that the game server 30 need not necessarily be configured of a single computer system, and may be configured of a plurality of computer systems deployed in a distributed manner over the network 40. Furthermore, although a single game client 20 is connected to the game server 30 in the example shown for convenience of explanation, a plurality of game clients 20 may be connected to the game server 30.

Figure 2:
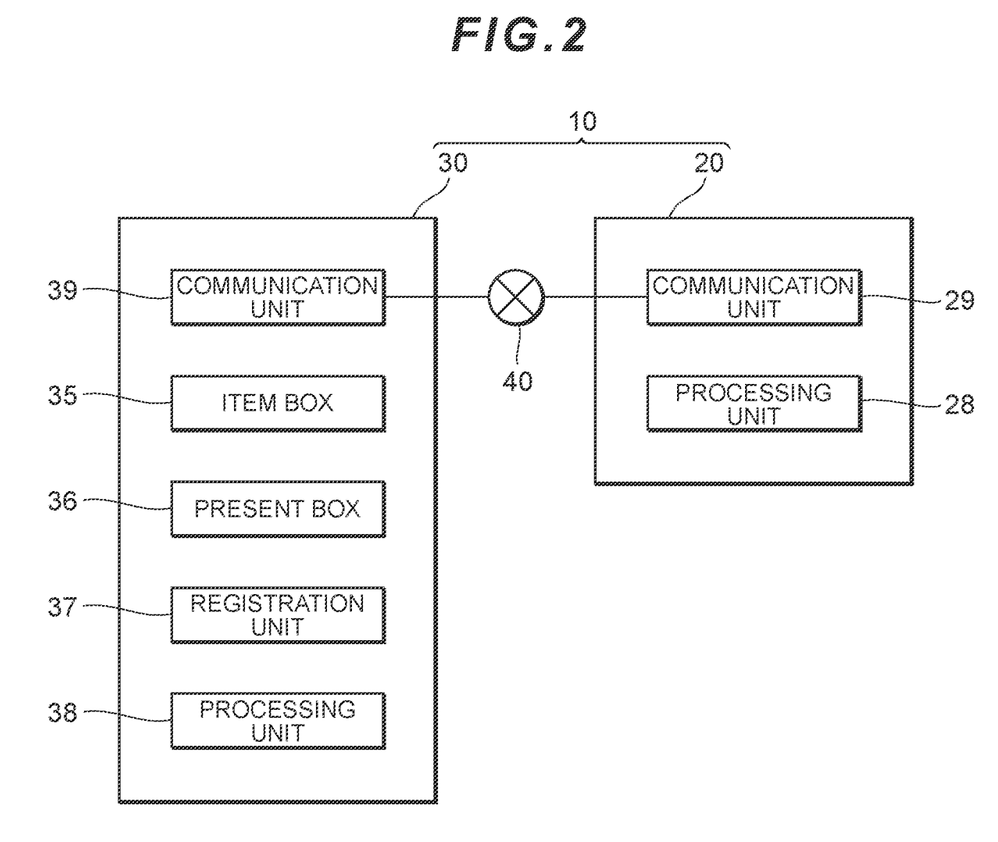
FIG. 2 is an illustration showing an example of the functions of the game system according to the present embodiment.

Next, the functions of the game system 10 according to this embodiment will be described with reference to FIG. 2.

The functions of a processing unit 28 and a communication unit 29 are realized through cooperation between the hardware resources and the computer program 27 of the game client 20. The processing unit 28 executes game processing at the game client 20. Examples of the game processing at the game client 20 include processing for accepting an input operation by the user from the operation unit 24, processing for requesting game processing associated with the input operation by the user to the game server 30, as well as processing for displaying a game screen on the display unit 25 and outputting a sound effect from the acoustic processing unit 26 on the basis of a game processing result received from the game server 30. The communication unit 29 controls the transmission of a game processing request and the reception of a game processing result, exchanged between the game client 20 and the game server 30. The communication unit 29 also performs processing for transmitting the automatic conversion condition preset by the user to the game server 30 via the network 40.

The functions of an item box 35, a present box 36, a registration unit 37, a processing unit 38, and a communication unit 39 are realized through cooperation between the hardware resources and the computer program 34 of the game server 30. The item box 35 is a first storage area, for which an upper-limit value of the number of items that can be stored is set. The present box 36 is a second storage area, which is different from the item box 35. A limit as to the number of items that can be stored in the present box 36 need not be set, or such a limit to the number may be set. The item box 35 and the present box 36 are allocated on a per-user basis. The item box 35 and the present box 36 are partial storage areas (e.g., logical volumes) of the storage device 32. Among items stored in the item box 35 or the present box 36, there may be items for which storage periods are defined, and there may also be items for which storage periods are not defined. An item for which a storage period is defined is automatically deleted from the item box 35 or the present box 36 after the elapse of the storage period. An example of an item for which a storage period is defined is a free item that can be obtained by accomplishing a quest. An example of an item for which a storage period is not defined is a paid item that is purchased by using a virtual currency in the game.

Note, however, that when an item for which a storage period is defined is moved from the present box 36 to the item box 35, the storage period of that item may be changed to be unlimited. Also note that it may be allowed to combine a plurality of items of the same type stored in the item box 35 into a single new item. In this case, for example, the sum of the individual experience values of the plurality of items before combining may be used as the experience value of the new item obtained by combining.

The registration unit 37 registers, on a per-user basis, the automatic conversion condition preset by the user. The processing unit 38 executes game processing at the game server 30. Examples of the game processing at the game server 30 include the execution of processing in response to a game processing request from the game client 20 and the transmission of a game processing result to the game client 20. In addition, the game processing at the game server 30 also includes the automatic conversion processing described earlier. The communication unit 39 controls the transmission of a game processing request and the reception of a game processing result, exchanged between the game client 20 and the game server 30.

Next, the setting of an automatic conversion condition will be described with reference to FIGS. 3 to 5.

The user is allowed to selectively set whether to enable or disable the function of the automatic conversion processing.

In the case where the function of the automatic conversion processing is enabled, the user is allowed to input the setting of an automatic conversion condition. As the automatic conversion condition, for example, one or more or all of the following may be used: (i) the number of items stored in the item box 35 exceeds a preset number; (ii) the kind of an item obtained by the user coincides with a preset kind; and (iii) the rarity of an item obtained by the user coincides with a preset rarity. In the case where a plurality of conditions are set as the automatic conversion condition, the automatic conversion processing is executed when all the conditions are satisfied.

Figure 3:
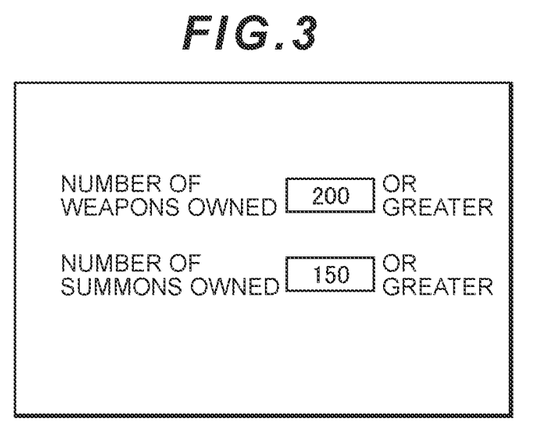
FIG. 3 is an illustration showing an example setting screen for an automatic conversion condition according to the present embodiment.

FIG. 3 shows an example screen for setting the number of items as an automatic conversion condition. In this example, a weapon obtained by the user (the 201st and subsequent weapons obtained by the user in this example) is subjected to the automatic conversion processing when the number of weapons stored in the item box 35 is greater than or equal to 200. Furthermore, a summon obtained by the user (the 151st and subsequent summons obtained by the user in this example) is subjected to the automatic conversion processing when the number of summons stored in the item box 35 is greater than or equal to 150.

Figure 4:
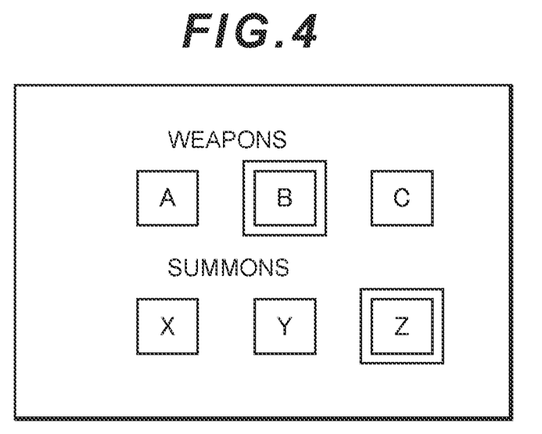
FIG. 4 is an illustration showing an example setting screen for an automatic conversion condition according to the present embodiment.

FIG. 4 shows an example screen for setting the kind of an item as an automatic conversion condition. In this example, weapon B is selected from among three kinds of weapons A, B, and C, and the automatic conversion processing is executed for weapon B. Furthermore, summon Z is selected from among three kinds of summons X, Y, and Z, and the automatic conversion processing is executed for summon Z. Note that either one of a weapon and a summon or both a weapon and a summon may be selected as an item or items for which the automatic conversion processing is executed.

Figure 5:
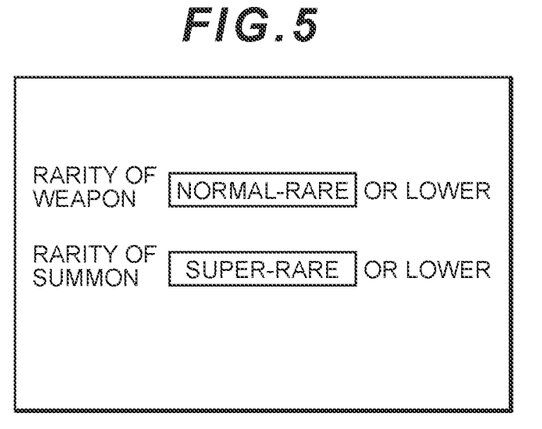
FIG. 5 is an illustration showing an example setting screen for an automatic conversion condition according to the present embodiment.

FIG. 5 shows an example screen for setting the rarity of an item as an automatic conversion condition. The rarity quantitatively indicates the degree of rarity. In this example, weapons having rarity lower than or equal to normal-rare are subjected to the automatic conversion processing. Furthermore, summons having rarity lower than or equal to super-rare are subjected to the automatic conversion processing. Note that normal-rare refers to rarity falling within a range of normal degrees. Super-rare indicates rarity higher than normal-rare. There is no need to set the degrees of rarity in a stepwise fashion, and for example, rarity may be set quantitatively in terms of numerical values. Furthermore, a setting may be made such that the automatic conversion processing is not executed for items having high rarity.

The communication unit 29 of the game client 20 sends information indicating whether the function of the automatic conversion processing is enabled or disabled to the game server 30. The registration unit 37 of the game server 30 registers, on a per-user basis, whether the function of the automatic conversion processing is enabled or disabled on the basis of the information received from the communication unit 29 of the game client 20. In the case where the function of the automatic conversion processing is set to be enabled, the communication unit 29 of the game client 20 sends information concerning the automatic conversion condition (e.g., information input via the setting screens in FIGS. 3 to 5) to the game server 30. The registration unit 37 of the game server 30 registers the information concerning the automatic conversion condition on a per-user basis on the basis of the information received from the communication unit 29 of the game client 20.

Figure 6:
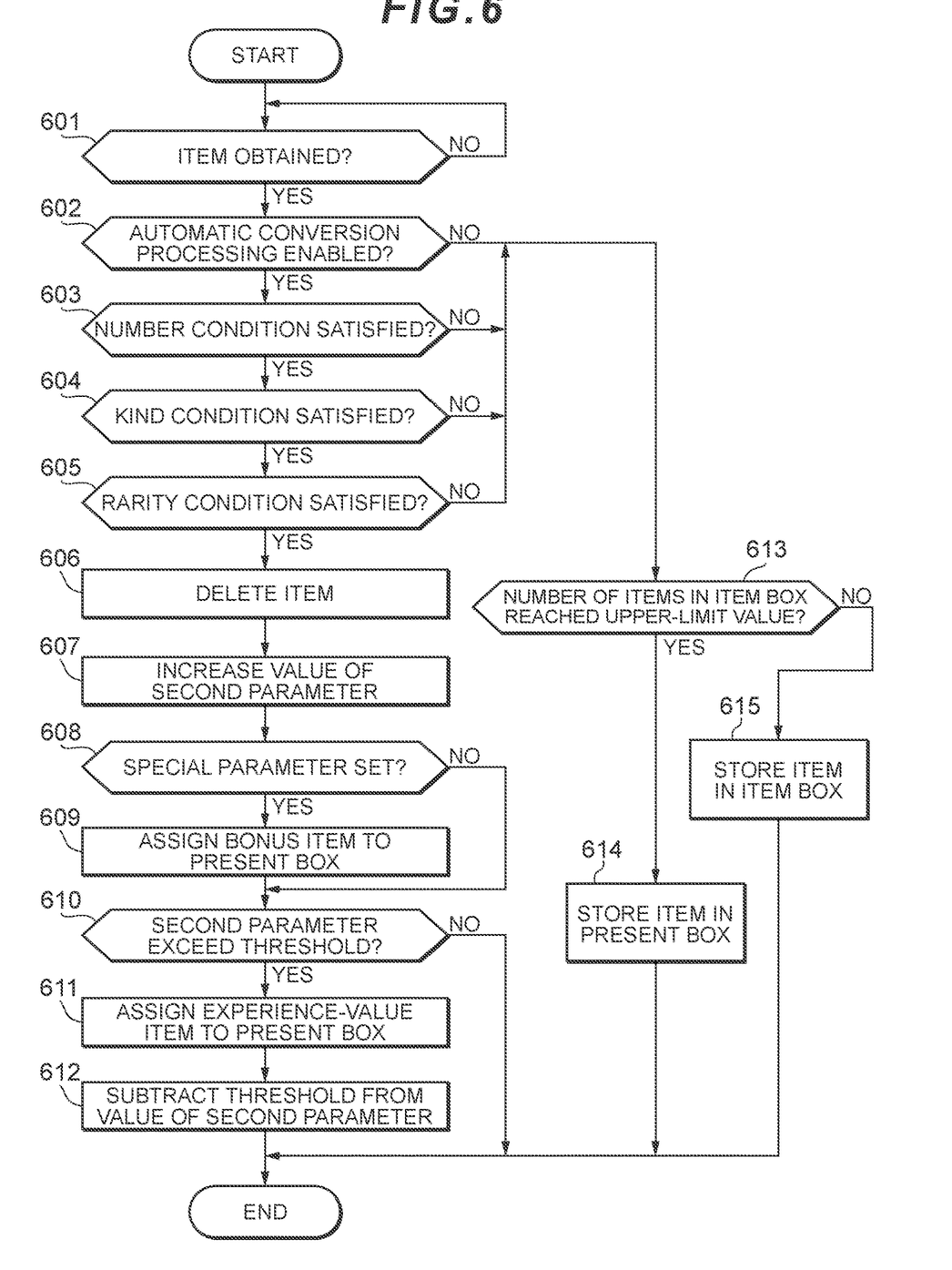
FIG. 6 is a flowchart showing an example of automatic conversion processing according to the present embodiment.

Next, the automatic conversion processing according to this embodiment will be described with reference to FIG. 6. Here, the case where all of (i) to (iii) described earlier are selected as the automatic conversion condition will be considered as an example.

In step 601, the processing unit 38 of the game server 30 determines whether or not the user has obtained an item.

In step 602, the processing unit 38 of the game server 30 determines whether or not the function of the automatic conversion processing is set to be enabled.

In step 603, the processing unit 38 of the game server 30 determines whether or not the number of items stored in the item box 35 exceeds a preset number.

In step 604, the processing unit 38 of the game server 30 determines whether or not the kind of the item obtained by the user coincides with a preset kind.

In step 605, the processing unit 38 of the game server 30 determines whether or not the rarity of the item obtained by the user coincides with a preset rarity.

In step 606, the processing unit 38 of the game server 30 deletes the item obtained by the user.

In step 607, the processing unit 38 of the game server 30 increases the value of the second parameter on the basis of the value of the first parameter of the deleted item.

In step 608, the processing unit 38 of the game server 30 determines whether or not a special parameter is set for the item satisfying the automatic conversion condition. An example of the special parameter is a parameter indicating bonus points. Here, bonus refers to a privilege in the game, which is assigned, for example, when the user accomplishes a certain goal. The special parameter may also be referred to as a third parameter.

In step 609, the processing unit 38 of the game server 30 assigns an item corresponding to the value of the special parameter to the item box 35 or the present box 36. The item corresponding to the value of the special parameter may be referred to, for example, as a bonus item. The bonus item is thus stored in the item box 35 or the present box 36.

In step 610, the processing unit 38 of the game server 30 determines whether or not the value of the second parameter exceeds a threshold.

In step 611, the processing unit 38 of the game server 30 assigns a predetermined item to the item box 35. The predetermined item may be referred to, for example, as an experience-value item. The experience-value item is thus stored in the item box 35.

In step 612, the processing unit 38 of the game server 30 subtracts the threshold from the value of the second parameter. This makes it possible to carry over the value remaining after subtracting the threshold from the value of the second parameter for the purpose of the next assignment of the predetermined item. An arbitrary method may be used as the method of carry-over processing.

In step 613, the processing unit 38 of the game server 30 determines whether or not the number of items stored in the item box 35 has reached an upper-limit value.

In step 614, the processing unit 38 of the game server 30 stores the item obtained by the user in the present box 36.

In step 615, the processing unit 38 of the game server 30 stores the item obtained by the user in the item box 35.

Note that the embodiment of the present invention is not limited to an online game but may be applied, for example, to a standalone game device.

Figure 7:
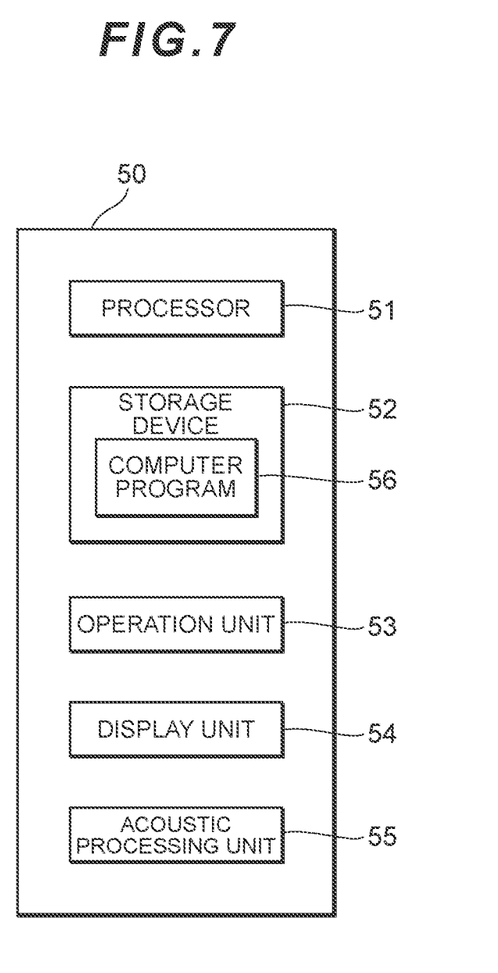
FIG. 7 is an illustration showing an example of the hardware configuration of a game device according to the present embodiment.
Figure 8:
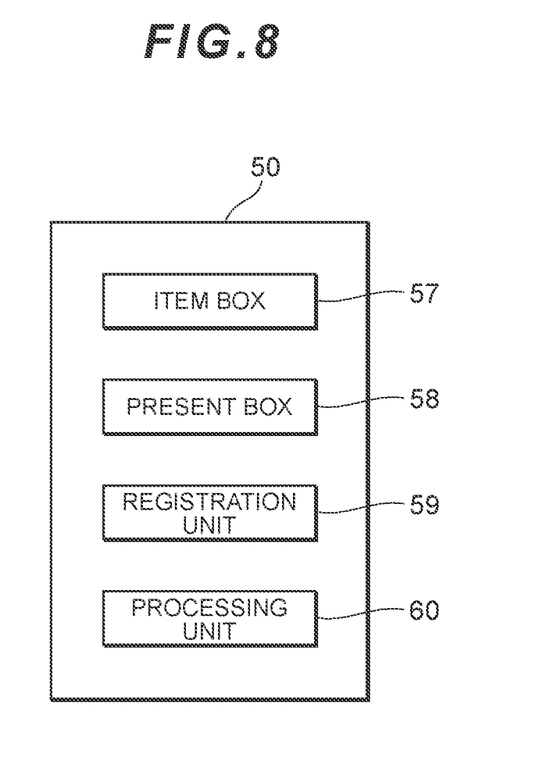
FIG. 8 is an illustration showing an example of the functions of the game device according to the present embodiment.

FIG. 7 is an illustration showing the hardware configuration of a game device 50 according to this embodiment. The game device 50 includes a processor 51, a storage device 52, an operation unit 53, a display unit 54, and an acoustic processing unit 55 as hardware resources thereof. The storage device 52 has recorded therein a computer program 56 for causing the processor 51 to execute game processing at the game device 50. The computer program 56 is a game program programmed for the game processing at the game device 50. As shown in FIG. 8, the functions of an item box 57, a present box 58, a registration unit 59, and a processing unit 60 are realized through cooperation between the hardware resources and the computer program 56 of the game device 50. The functions of the item box 57, the present box 58, the registration unit 59, and the processing unit 60 of the game device 50 are the same as the functions of the item box 35, the present box 36, the registration unit 37, and the processing unit 38 of the game server 30.

In the embodiment described above, each of the functions of the game client 20 (the processing unit 28 and the communication unit 29), each of the functions of the game server 30 (the item box 35, the present box 36, the registration unit 37, the processing unit 38, and the communication unit 39), and each of the functions of the game device 50 (the item box 57, the present box 58, the registration unit 59, and the processing unit 60) need not necessarily be realized through cooperation between a hardware resource and a computer program, and may be realized, for example, by using a special hardware resource (e.g., an application-specific integrated circuit (ASIC) or a field-programmable gate array (FPGA)).

REFERENCE SIGNS LIST

10 Game system
20 Game client
21 Processor
22 Storage device
23 Communication module
24 Operation unit
25 Display unit
26 Acoustic processing unit
27 Computer program
28 Processing unit
29 Communication unit
30 Game server
31 Processor
32 Storage device
33 Communication module
34 Computer program
35 Item box
36 Present box
37 Registration unit
38 Processing unit
39 Communication unit
40 Network
50 Game device
51 Processor
52 Storage device
53 Operation unit
54 Display unit
55 Acoustic processing unit
56 Computer program
57 Item box
58 Present box
59 Registration unit
60 Processing unit

The invention claimed is:

1. A game program that causes a computer system to execute:
   a step of performing an electronic game by a user on the computer system;
   a step of determining, during the electronic game and when the user has obtained a virtual item, whether or not the virtual item satisfies a condition preset by the user;
   a step of deleting, during the electronic game, the virtual item obtained by the user and increasing the value of a second parameter on the basis of the value of a first parameter of the deleted virtual item when the condition is satisfied;
   a step of storing, during the electronic game, the virtual item obtained by the user in a first storage area of the computer system when the condition is not satisfied, the first storage area having set therefor an upper-limit value as to the number of instances of the virtual item that can be stored therein;
   a step of storing, during the electronic game, the virtual item obtained by the user in a second storage area of the computer system when the condition is not satisfied and the number of instances of the virtual item stored in the first storage area has reached the upper-limit value; and
   a step of storing, during the electronic game, a predetermined virtual item in the first storage area when the value of the second parameter exceeds a threshold.

2. A game program according to claim 1, wherein the game program further causes the computer system to execute:
   a step of carrying over the value remaining after subtracting the threshold from the value of the second parameter for the purpose of the next assignment of the predetermined virtual item upon storing the predetermined virtual item in the first storage area.

3. A game program according to claim 1, wherein the condition includes a condition that the number of instances of the virtual item stored in the first storage area exceeds a preset number.

4. A game program according to claim 1, wherein the condition includes a condition that the kind of the virtual item obtained by the user coincides with a preset kind.

5. A game program according to claim 1, wherein the condition includes a condition that the rarity of the virtual item obtained by the user coincides with a preset rarity.

6. A game program according to claim 1, wherein the first parameter is an experience value of the virtual item.

7. A game program according to claim 1, wherein the predetermined virtual item is a virtual item with which the first parameter is associated.

8. A game program according to claim 7, wherein the value of the first parameter associated with the predetermined virtual item is equal to the threshold.

9. A game program according to claim 1, wherein the game program further causes the execution of a step of storing, in the case where a third parameter is associated with the virtual item satisfying the condition, a virtual item corresponding to the value of the third parameter in the first storage area or the second storage area.

10. A game server comprising:
   a processing unit that is configured to:
      perform an electronic game by a user,
      determine, during the electronic game and when a user has obtained a virtual item, whether or not the virtual item satisfies a condition preset by the user, and
      delete, during the electronic game, the virtual item obtained by the user, and
      increase, during the electronic game, the value of a second parameter on the basis of the value of a first parameter of the deleted virtual item when the condition is satisfied;
   a first storage area, where the virtual item obtained by the user is stored when the condition is not satisfied, the first storage area having set therefor an upper-limit value as to the number of instances of the virtual item that can be stored therein; and
   a second storage area, where the virtual item obtained by the user is stored when the condition is not satisfied and the number of instances of the virtual item stored in the first storage area has reached the upper-limit value,
   wherein the processing unit stores a predetermined virtual item in the first storage area when the value of the second parameter exceeds a threshold.

11. A game system comprising a game server and a game client, the game client including:
   a communication unit that sends a condition preset by a user to the game server via a network, the game server including:
   a processing unit that is configured to:
      perform an electronic game by the user,
      determine, during the electronic game and when the user has obtained a virtual item, whether or not the virtual item satisfies the condition preset by the user, and
      delete, during the electronic game, the virtual item obtained by the user and increases the value of a second parameter on the basis of the value of a first parameter of the deleted virtual item when the condition is satisfied;
   a first storage area, where the virtual item obtained by the user is stored when the condition is not satisfied, the first storage area having set therefor an upper-limit value as to the number of instances of the virtual item that can be stored therein; and
   a second storage area, where the virtual item obtained by the user is stored when the condition is not satisfied and the number of instances of the virtual item stored in the first storage area has reached the upper-limit value,
   wherein the processing unit stores a predetermined virtual item in the first storage area when the value of the second parameter exceeds a threshold.

12. A game device comprising:
   a processing unit that is configured to:
      perform an electronic game by a user,
      determine, during the electronic game and when the user has obtained a virtual item, whether or not the virtual item satisfies a condition preset by the user, and that
      delete, during the electronic game, the virtual item obtained by the user and
      increase, during the electronic game, the value of a second parameter on the basis of the value of a first parameter of the deleted virtual item when the condition is satisfied;
   a first storage area, where the virtual item obtained by the user is stored when the condition is not satisfied, the first storage area having set therefor an upper-limit value as to the number of instances of the virtual item that can be stored therein; and
   a second storage area, where the virtual item obtained by the user is stored when the condition is not satisfied and the number of instances of the virtual item stored in the first storage area has reached the upper-limit value,
   wherein the processing unit stores a predetermined virtual item in the first storage area when the value of the second parameter exceeds a threshold.

* * * * *